Jan. 3, 1950 W. E. ZIMMERMANN ET AL 2,493,212
APPARATUS FOR FEEDING AND TRANSFERRING ARTICLES
Filed June 3, 1946 6 Sheets-Sheet 6
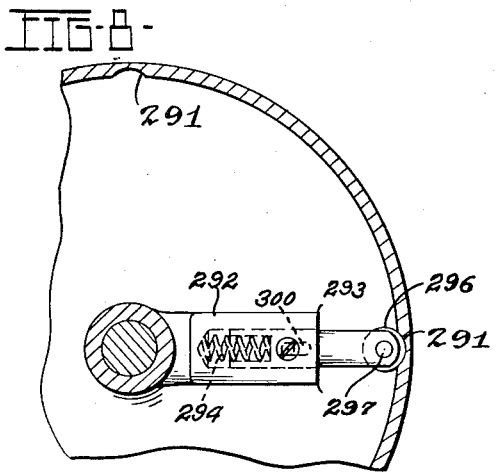
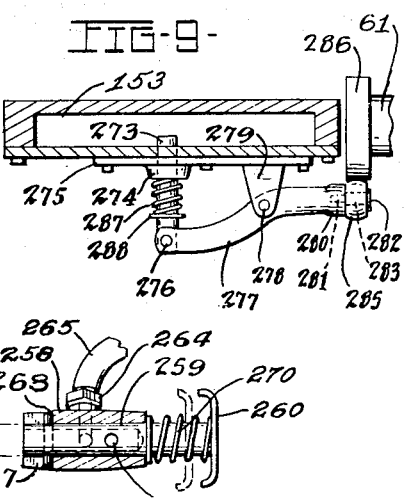
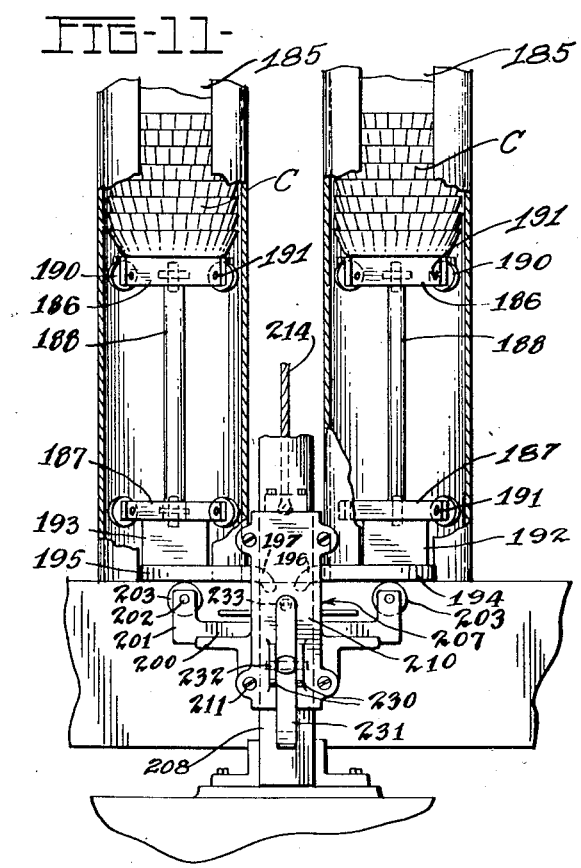
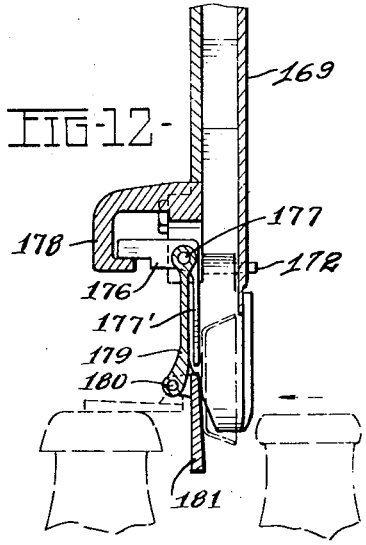
INVENTORS.
Willy E. Zimmermann.
BY Herman E Weidanz.
Joseph B. Lindecker.
Attorney

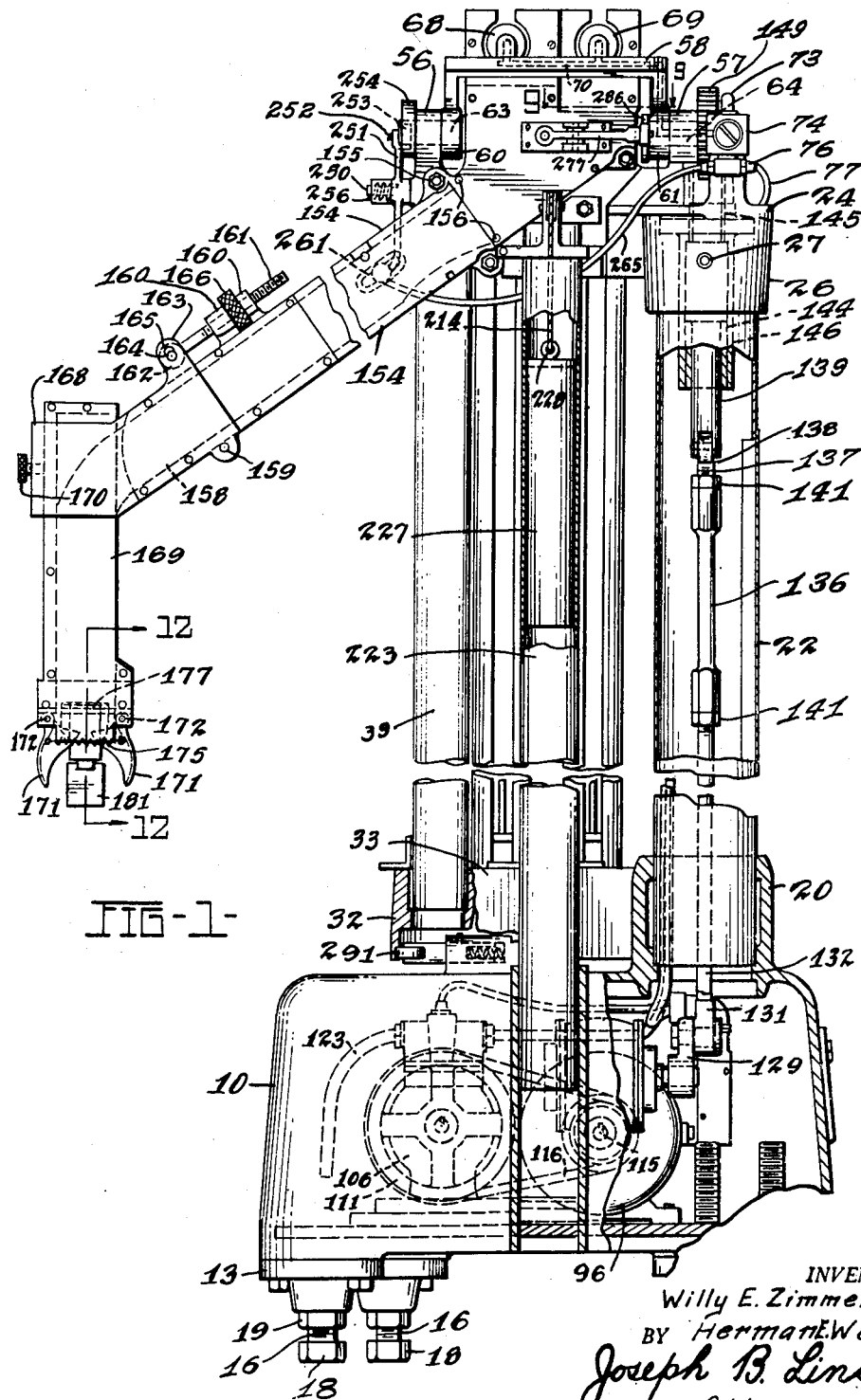

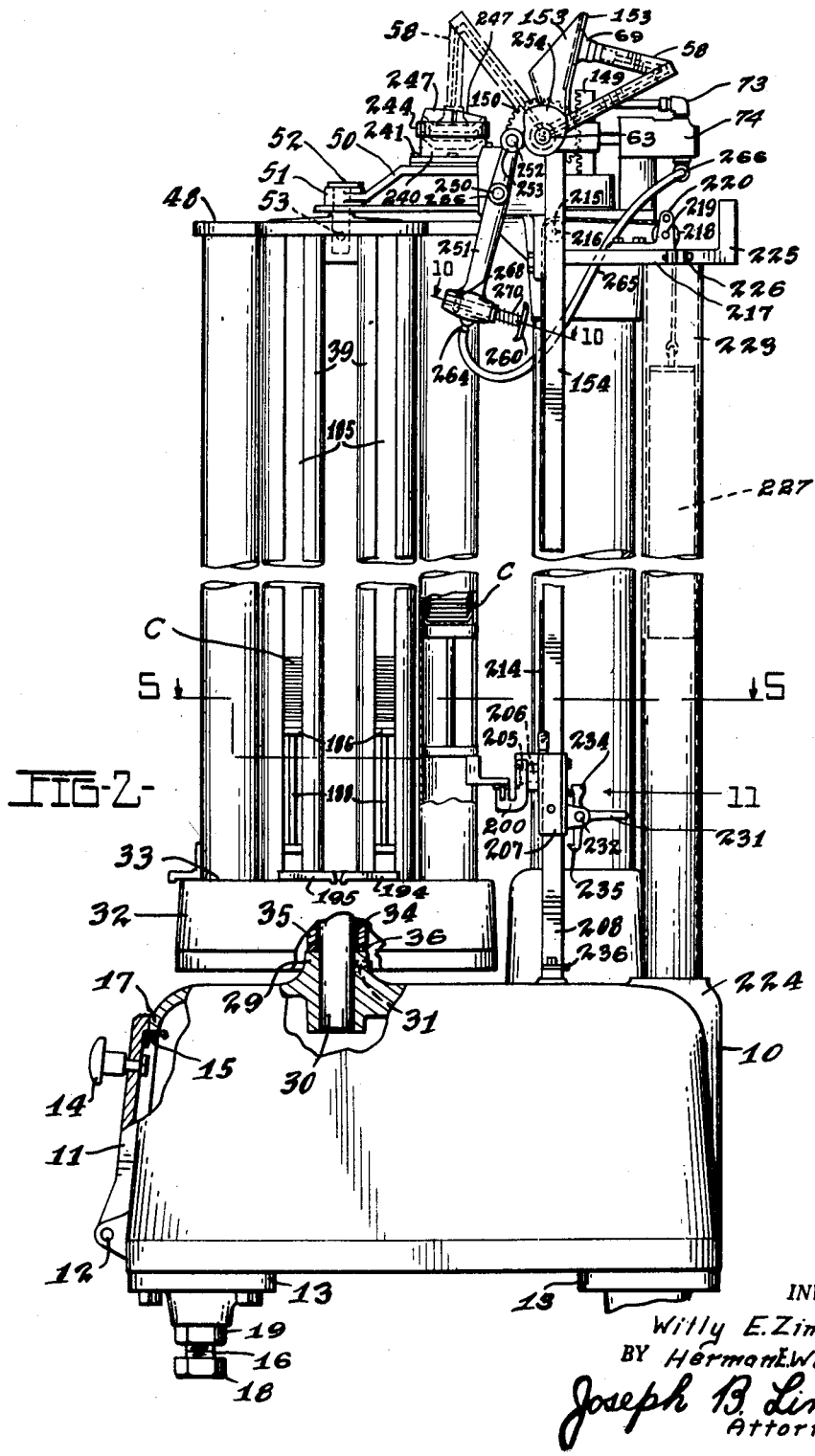

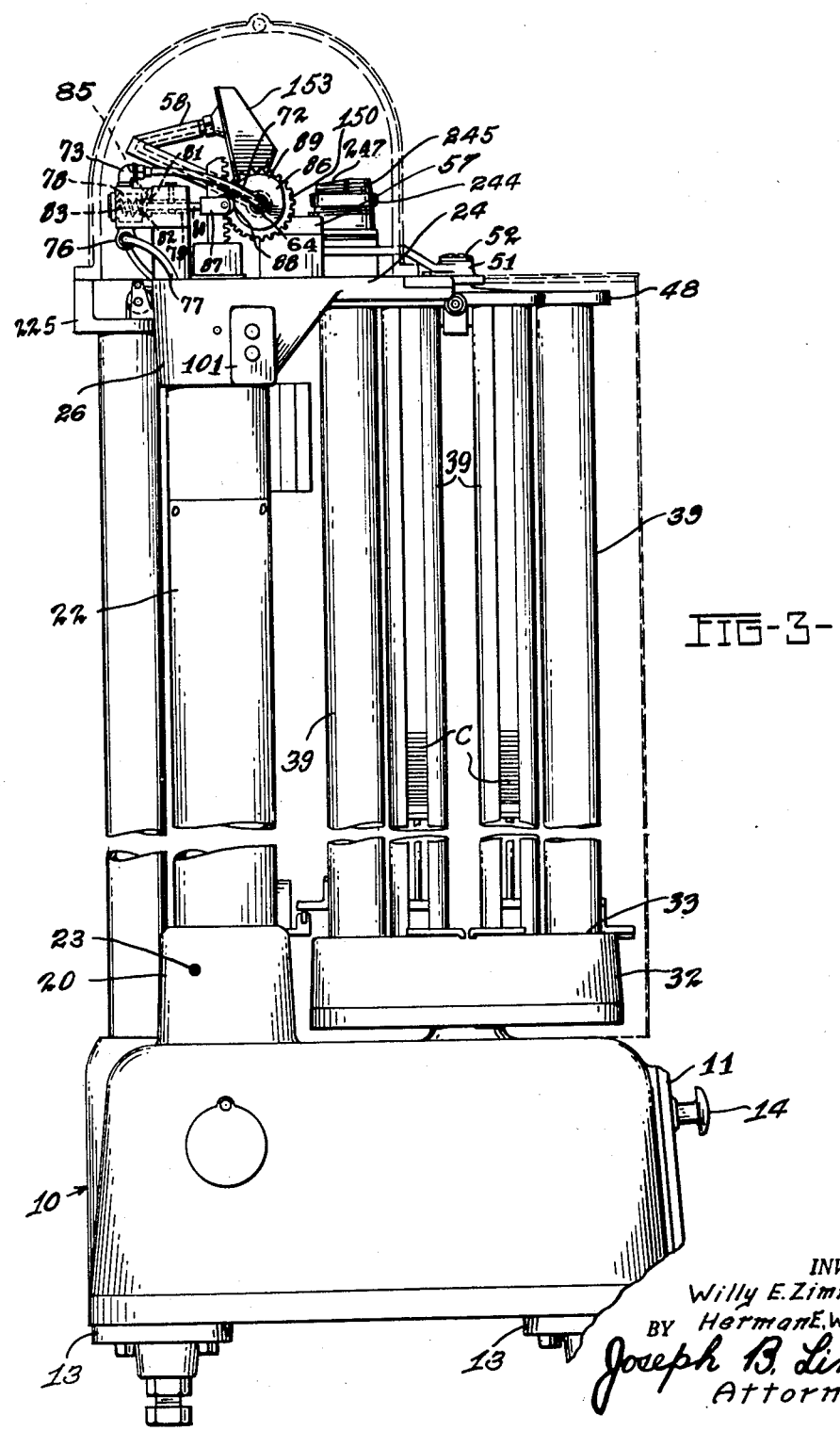

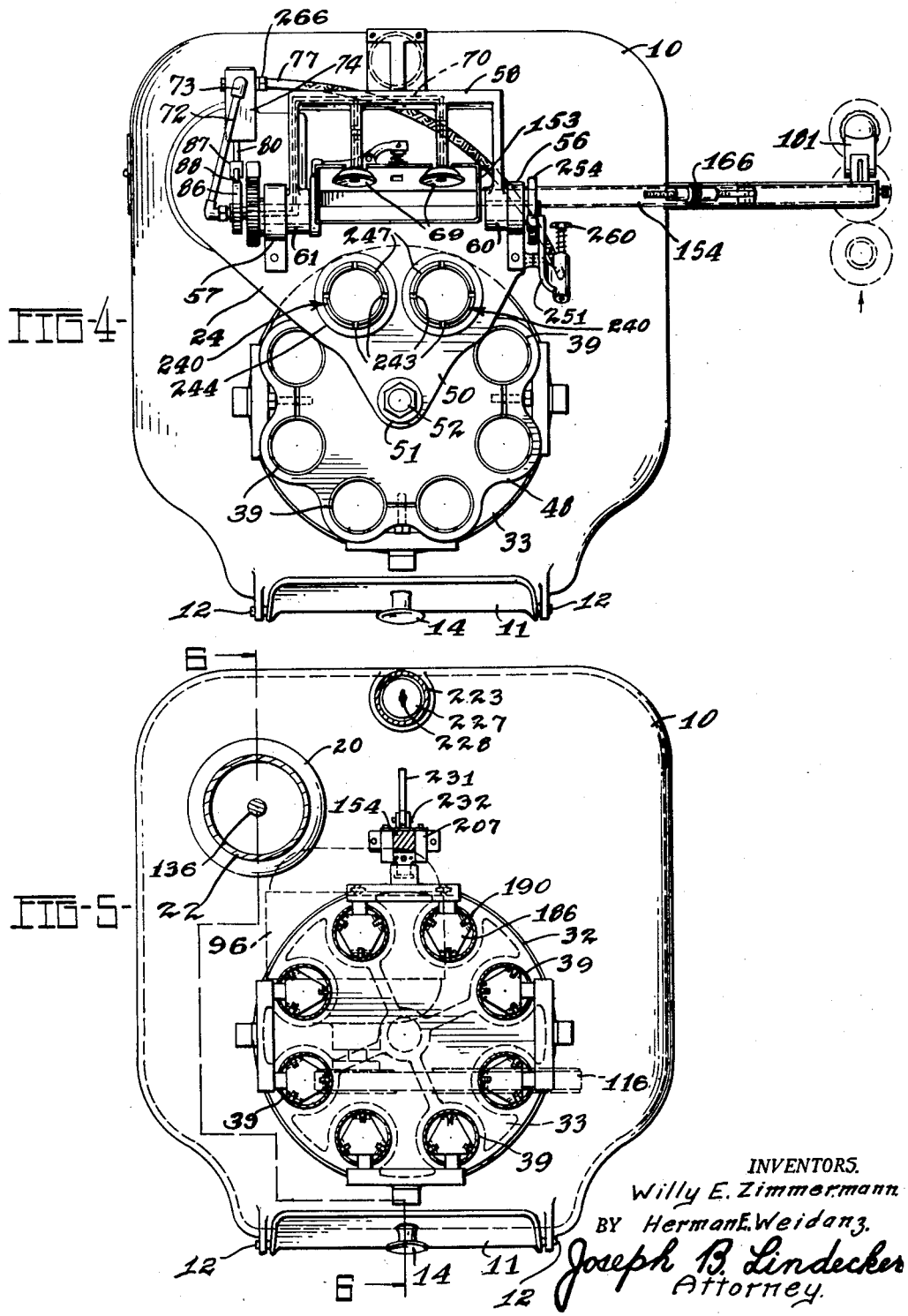

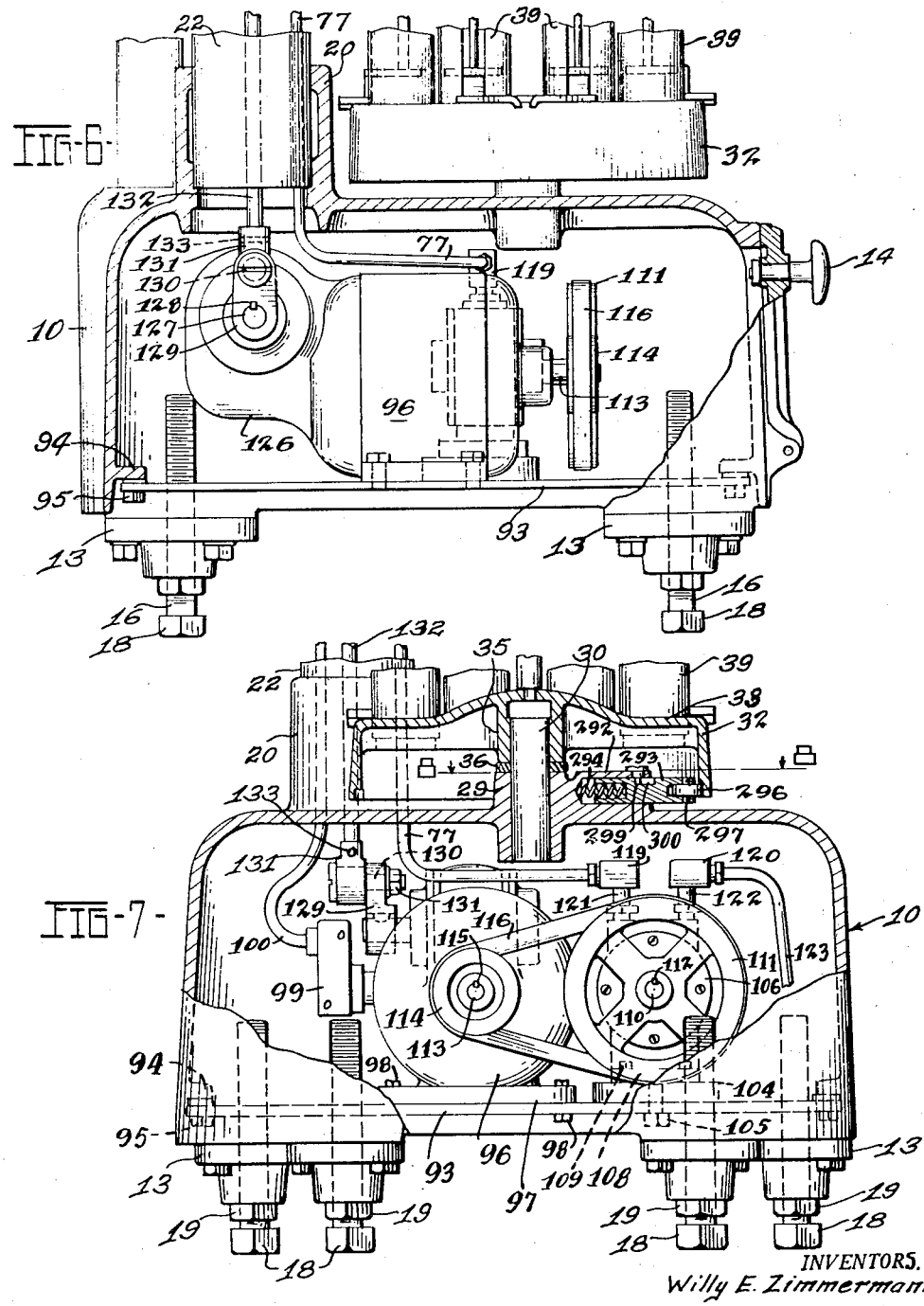

Patented Jan. 3, 1950

2,493,212

UNITED STATES PATENT OFFICE 2,493,212

APPARATUS FOR FEEDING AND
TRANSFERRING ARTICLES

Willy E. Zimmermann and Herman E. Weidanz, Chicago, Ill., assignors to Standard Cap and Seal Corporation, Chicago, Ill., a corporation of Illinois Application June 3, 1946, Serial No. 674,054

18 Claims. (Cl. 226—88.1)

This invention relates to a method and apparatus for feeding, transferring or delivering articles and more especially to a method and arrangement for transferring and delivering closures to a station where the same are applied to containers.

The invention comprehends the provision of apparatus or mechanism for serving caps or closures to a station from whence they are discharged onto containers, for example milk bottles, and wherein the arrangement of feeding and applying the closures to containers is automatic.

The invention embraces a closure serving and delivering apparatus equipped with a closure retaining or storage magazine having a comparatively large capacity whereby the serving and applying mechanism may operate for long periods of time without the necessity of continuously replenishing the closure supply in the magazine.

An object of the invention is the provision of a closure feeding and serving apparatus embodying a closure storage magazine in which the latter is disposed at a convenient place for refilling, and in which the closures are moved upwardly to a closure transferring mechanism for conveying the closure from the magazine into a serving chute.

Another object of the invention resides in the provision of closure feeding and serving apparatus embodying a closure storage and supply means which is inclusive of a plurality of tubular housings or magazines to accommodate the closures and which closure supply means is relatively movable whereby the tubular magazines may be intermittently moved into registration and operative association with the closure transferring and serving means.

Another object of the invention resides in a closure magazine for closure feeding and serving mechanism including a series of juxtaposed tubes adapted to retain a large supply of skirted closures, the tubes being supported for selective movement to a position whereby the caps may be discharged from the upper ends of the magazine tubes by closure transferring means.

Another object of the invention resides in a combination closure feeding and delivering mechanisms in combination with a tubular closure storage magazine wherein the closures are successively moved upwardly into position to be conveyed to a serving chute by suitable automatic closure transferring means.

Still another object of the invention is the provision of a multi-tubular magazine for container closures wherein closures are removed from two tubes of the magazine simultaneously and wherein the closures are moved to the closure transferring means by an arrangement engageable with the lower-most closures in said tubes.

Still another object of the invention is the provision of means associated with a closure feeding and serving mechanism in which the presence of a closure or predetermined number of closures in the delivery chute will temporarily impede the transferring and feeding of additional closures to the chute pending the further disposition or discharge of closures from the closure applying station.

Still a further object of the invention resides in the provision of a closure retaining magazine wherein closures are discharged from a plurality of groups of closures simultaneously, the arrangement being inclusive of means for feeding the closures upwardly, said means being in engagement with the lowermost closure of each group and incorporating means for equalizing the force acting on the plurality of groups of closures to advance the closures to the point of discharge from the magazine.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawings of a form of the invention which may be preferred, in which:

Figure 1 is a rear elevation view of the closure feeding and serving apparatus of our invention, certain parts being shown in section for purposes of illustration;

Figure 2 is a side elevation view of the machine shown in Figure 1;

Figure 3 is a view of the opposite side of the machine;

Figure 4 is a top plan view of the machine with the cover removed;

Figure 5 is a horizontal sectional view through the machine, the view being taken substantially on the line 5—5 of Figure 2, Figure 6 is a vertical sectional view through the base of the machine, the view being taken substantially on the line 6—6 of Figure 5;

Figure 7 is another view through the base of the machine, a portion of the base housing and certain parts being shown in section;

Figure 8 is a detail sectional view taken substantially on the line 8—8 of Figure 7;

Figure 9 is a detail sectional view taken substantially on the line 9—9 of Figure 1;

Figure 10 is a detail sectional view taken substantially on the line 10—10 of Figure 2;

Figure 11 is a detail elevational view showing an arrangement of closure elevating means and Figure 12 is a vertical sectional view taken substantially on the line 12—12 of Figure 1.

While we have illustrated an embodiment of our invention as a mechanism particularly arranged and adapted for transferring, feeding and applying skirted caps or closures to containers and especially a machine for applying skirted closures to milk bottles, it is to be understood that we contemplate the utilization of our invention wherever it may be found desirable to transfer and deliver articles from a supply to an article disposing station.

The arrangement and form of the invention disclosed is of a type which is readily portable and adjustable although of unitary character, the same construction and arrangement may be used or is usable with various sizes of containers and various types and kinds of container filling machines.

The arrangement of our invention for carrying out the method of feeding and serving container closures is inclusive of a hollow base or supporting frame 10 which encloses mechanism to be hereinafter described, the base being generally rectangular in configuration and being provided with an opening which is normally covered by means of a closure or door 11 hinged to the base 10 by means of pintles 12. A manipulating knob 14 is provided for the closure and a resilient plate or spring 15 is secured to the closure 11 and is arranged to snap over the depending flange 17 formed on the base to hold the cover in closed position as shown in Figure 2. Secured to the corner portions of the base 10 are flanged fittings 13 which are bored and threaded to receive threaded members 16 having polygonal heads 18 which rest upon a supporting surface. The threaded members 16 may be adjusted vertically in the flanged fittings 13 and are adapted to be locked in adjusted position by means of locking nuts 19. By this means the base may be raised or lowered or the same accommodated to an out-of-level position of the supporting surface.

Formed upon the upper portion of the base 10 is an upwardly projecting boss portion 20 which is bored to receive an upwardly extending tube 22, a set screw 23 securely holding the tube 22 in the boss 20, the tube serving as a frame element supporting an upper frame construction 24 upon which is mounted mechanism forming part of the invention. The frame 24 is formed with an integrally depending boss portion 26 which is bored to receive an upper end portion of the tube 22 which is positioned and secured in the boss by means of a set screw 27.

The present invention is inclusive of a magazine construction for storing and retaining a comparatively large supply of closures. To this end the closure magazine construction is a unitary assembly of a plurality of magazine tubes which are relatively movable or rotatable as a unit and are supported upon the base 10. The base 10 is provided with a central hollow boss portion 29 within which is mounted a stub shaft 30 held in place by means of a set screw 31. Journally supported upon the upper end of the shaft 30 is a circular member 32 having top or table portion 33, a bearing member or bushing 34 being interposed between the shaft 30 and a boss portion 35 which depends from the table 33. A thrust bearing or annulus 36 of suitable bearing material is interposed between boss portions 29 and 35 to facilitate ease of rotation of the member 32 by reducing friction to a minimum.

The table portion 33 of member 32 is formed with plurality of depending boss portions which are bored to receive the lower ends of a plurality of tubular members or closure magazines 39. In the embodiment illustrated eight tubes are utilized, four sets of two tubes each. As hereinafter described two closures are transferred simultaneously from two magazine tubes to the closure delivery chute. The upper ends of the tubes 39 project into suitable cylindrical openings formed in a member 48 which, like member 32, is arranged for relative rotative movement. To this end, the upper frame member 24 is formed with a projecting portion 50 formed with a boss portion 51 which is bored to receive the shank of a machine screw 52. Member 48 is formed with a central boss portion bored and threaded to receive the threaded extremity of the machine screw 52, the latter being locked to member 48 by means of a locking screw 53. By this means the members 32 and 48 and tubes 39 form a closure magazine unit which is journaled for rotation about a vertical axis extending through stub shaft 30 and machine screw 52. The tubes 39 are each adapted to receive and retain a supply of nested skirted closures which are moved upwardly to a closure transferring station where they are transferred and delivered into a conveying chute.

The closure transferring mechanism is mounted upon the frame member 24 which is formed with uniplanar surfaces to accommodate brackets 56 and 57, the latter secured to frame 24 by screws or other suitable means (not shown). Disposed between the brackets 56 and 57 is a U-shaped member 58, the leg portions of which terminate in boss portions 60 and 61. The bosses 60 and 61 are bored to accommodate shafts 63 and 64 whereby the U-shaped member 58 is journaled for rotary movement about the axis of aligned shafts 63 and 64. The relatively movable member 58 is equipped with means for engaging and transferring closures from the magazines or tubes 39 into a hopper 153 to which is connected a delivery chute 154. This means is inclusive of a pair of cap or closure engaging means 69 formed of resilient material, as for example rubber, and are of slight cone-shaped configuration forming a cup adapted for engagement with closures in the tubes 39. The closure engaging cups 69 are provided with hollow stem portions which are in communication with a manifold or duct 70 formed in the U-shaped member 58. The duct 70 is in communication with a flexible tube 72 which extends into an L-shaped fitting 73 in communication with a valve chamber in housing 74. The housing is provided with another fitting 76 connected by means of a tube 77 with a vacuum pump 106 disposed in the base 10.

The housing 74 encloses mechanism for controlling the action or effectiveness of the vacuum or reduced pressure in the cups 69 for the purposes hereinafter explained. The housing 74 is bored to provide a chamber 78 communicating with a bore in which is disposed a bushing 79 within which is slidably mounted a valve stem or plunger 80, the inner end of which is formed with a conical valve portion 81 which seats against a shoulder or ledge 82 formed in the housing. An expansive coil spring 83 is disposed in a chamber 78 and engages the head portion of valve 81 to urge the valve into closed position viz., to seat upon the ledge 82.

Fixedly mounted upon the shaft 64 is a cam or control means 86 and the valve stem 80 is equipped with a member 87 which is slotted to accommodate a roller or cam follower 88 which engages the exterior cam surface or contour of the cam 86. The space beneath the valve seat 81 is vented to the atmosphere by means of a suitable opening 85 for breaking the vacuum in the chamber 78 and hence any effective vacuum or reduced pressure in the suction cups 69. The breaking of the vacuum takes place when the lobe 89 of the cam 86 is in engagement with the follower 88 to open or move the valve 81 away from its seat 82.

The base member 10 of the machine frame is provided with a bottom or base plate 93 which is secured to lugs 94 formed integrally on the interior of the base by screws 95 or other suitable securing means. Supported upon the base plate 93 is an electrically energized motor 96, the flanged plate 97 of the motor structure being secured to the base 93 by means of screws 98. Suitable wiring for the motor is enclosed in a box fitting 99 which communicates by means of conduit 100 with a starting switch mechanism contained within a control box 101 which is secured to the upright tubular frame member 24. Electrical energy for operating the motor may be secured from a supply line (not shown).

Also mounted upon the base plate 93 is a support or block 104 secured to the plate by means of screws 105. The vacuum pump 106 of conventional form is mounted upon the block, the housing for the pump being integrally formed with a flange 108 which is secured to the supporting block by means of screws 109. The rotor shaft 110 of the vacuum pump projects exteriorly of the housing and is fitted with a pulley 111 secured by means of a key 112 to the shaft to rotate therewith. The motor shaft 113 is also fitted with a driving pulley 114 secured to shaft 113 by means of the key 115. A driving belt 116 overtakes the pulleys 111 and 114 for driving the vacuum pump 106 from the motor 96. The vacuum pump housing is equipped with fittings 119 and 120 which communicate with the interior of the pump by means of tubes 121 and 122, the fitting 119 and tube 121 being in communication with the exhaust side of the vacuum pump, the fitting 119 being connected by means of tube 77 with the valve chamber or housing 74. The fitting 120 is provided with a tube 123 open to the atmosphere through which air exhausted from the tube 77 and connecting tubes or ducts is discharged to the atmosphere. During the operation of the machine, the vacuum pump 106 is operated continuously by the motor 96 to impress a subatmospheric pressure in the duct system associated with the valve chamber 74 and the resilient cups 69 under predetermined conditions, the vacuum being effectively set up whenever the cups 69 are temporarily closed during their engagement with the disc-like central portions of container caps or closures C in a manner hereinafter explained.

Means are provided for operating the closure transferring arm 58, the cam 86 and other mechanism to be hereinafter described. To this end, the housing of motor 96 is formed with an extension 126 in which is journaled a shaft 127, the latter being connected to the motor shaft by the interposition of suitable reduction gearing (not shown) whereby the shaft 127 rotates at a much lower speed than the motor shaft 113. Secured upon the shaft 127 by means of a key 128 is a crank or crank arm 129, the end portion of which is bored to receive a crank pin 130 which is secured to the crank arm 129 by means of a nut 131 which is disposed upon the threaded end of the crank pin 130. Pivotally journaled on the crank pin 130 is a fitting 131 to which is connected a rod 132 which is secured to fitting 131 by means of a pin 133, the fitting 131 and rod 132 forming a pitman for actuating mechanism carried by the frame plate 24 at the upper portion of the machine.

The upper end of rod 132 is threaded and extends into one end of a turn-buckle 136. The upper end of the turn-buckle 136 is threaded to receive a threaded tenon 137 formed on a member 138, the latter extending into a slot formed in a plunger 139 and being swivelly connected thereto by means of a pivot pin 140. The threaded portion of rod 132 and the threaded tenon 137 are adapted to accommodate locking nuts 141 to secure the rod and tenon in adjusted position on the turn-buckle. The ram 139 is mounted for vertical slidable movement in bushings 144 and 145 which are mounted in a sleeve-like member 146, the latter having a flanged portion 147 which is secured to the frame member 24 by screws or other suitable means (not shown). The upper end of the plunger 139 is provided with a toothed rack 149 which is in enmeshment with toothed wheel or pinion 150 which is keyed or otherwise fixedly secured upon shaft 64. The vertical reciprocation of rack 149 imparts rotary movement to the shafts 63, 64 and the closure transferring arm 58 and associated mechanism.

The closures are transferred, in a manner to be hereinafter explained, from the magazine tubes 39 into a hopper-shaped member 153, to the lower end of which is connected an angularly disposed closure receiving and conveying chute 154, the hopper 153 being secured to the frame portion 24 by means of bolts 156, while the chute 154 is connected to the machine frame by means of screws 155. The chute 154 is provided with a relatively adjustable section 158 which is pivoted to section 154 by means of a pivot shaft 159. One wall of the relatively stationary chute 154 is provided with a pair of upwardly extending lugs 160 which are smoothly bored to receive a threaded member 161, the latter being threaded through a knurled adjusting wheel 166 which is disposed between the lugs 160. The threaded member 161 is formed with a head portion 162 which is disposed between a pair of upwardly extending spaced projections 163 formed on the relatively movable chute section 158. The head portion 162 is provided with a pin 164 extending therethrough, the extended portions of the pin projecting into slots 165 formed in projections 163. The chute section 158 is provided with a horizontally extending portion 168 which has a vertically arranged rectangular hollow interior adapted to slidably receive and accommodate a vertically disposed chute section 169, the latter being held to the horizontal portion 168 by clamping means such as a thumb screw 170. The chute section 169 may be adjusted in a vertical direction by manipulation of the thumb screw 170. The purpose of the adjustment is to accommodate the discharge of closures on to receptacles or containers of different heights.

The lower extremity of the chute section 169 provides a discharge station for discharging or disposing of closures or caps onto receptacles. The closure discharge arrangement includes a pair of closure retaining wings or members 171 which are pivoted to the chute section 169 by means of pivot pins 172, the wing members 171 being urged toward each other by means of a contractible spring 175. The contour of the members 171 is such as to resiliently retain a closure in discharge position until its removal by contact with a receptacle mouth.

Means are provided for properly guiding the closures or caps onto receptacles which means is inclusive of an element 176 pivotally supported upon a pin 177, the element 176 having a depending portion 177' which, in effect, forms a guide portion for directing closures into the wing-like members 171. The member 176 is disposed in a normal depending position by means of a hook-like member 178 which engages member 176 as shown in Figure 12 but is arranged for clock-wise pivotal movement to facilitate the proper discharge of caps from the station. Also pivotally supported upon the pin 177 is a member 179 and pivotally connected to the extremity thereof by means of pivot pin 180 is a member or element 181. The element 181 is adapted to contact the upper surfaces of closures being discharged from the station and functions to properly direct the closures onto the receptacle mouths, the pivotal support therefor, permitting the element 181 to assume a horizontal position as a closure deposited upon a receptacle moves away from the discharge station.

Means are provided for moving the supply of caps or closures C in the magazine tubes 39 upwardly to a station or place where they are transferred to the hopper 153. The magazine tubes 39 are formed with longitudinally extending slots or openings 185 and each tube is provided with a closure engaging and elevating means, each closure engaging means being slidably disposed in its respective tube or magazine 39. Each of the closure engaging means shown in Figure 11 is inclusive of pairs of spaced members 186, 187 which are connected together by means of a rod 188. The upper surface of each member 186 engages the lower-most closure in the magazine tubes 39. As shown in Figure 5, each of the members 186 and 187 is generally of triangular configuration, each projecting portion thereof being slotted to accommodate circular discs or rollers 190 which are journaled on suitable pins 191. The upper surfaces of members 186 are arranged for engagement with the lowermost closures in the magazine 39, the cap engaging means being arranged to elevate closures in two of the magazine tubes simultaneously. To this end there is associated with each pair of cap engaging means connecting blocks 192 and 193 which are mounted respectively upon laterally extending members or plates 194 and 195, the adjacent inner ends of plates 194 and 195 extending downwardly in the form of projections 196 and 197. Arranged adjacent the plates 195 and 194 is an inverted T-shaped bracket 200 formed with upwardly extending projections 201, each of said projections being provided with a pin 202 upon which is journaled a roller 203. The stem or central portion of the T-shaped bracket 200 is pivotally mounted upon a journal pin 205, the threaded tenon portion 206 of which is threaded into the wall of a member 207 which is formed with a hollow interior configuration of U-shaped cross section and arranged for slidable movement upon a vertically disposed shaft 208 of polygonal cross section. The shaft or rod 208 is mounted upon the base 10 at its lower end and is secured to the frame member 24 at its upper extremity. The member or runner 207 is adapted to receive a plate 210 which is held in place by means of screw 211. A pivotal support for the bracket 200 permits the equalization of pressure exerted upon the pairs of cap engaging means through the contact of rollers 203 with the individually movable plates 194 and 195.

Means are provided for urging the member 207 upwardly together with the cap engaging means disposed in the closure retaining magazine tubes 39. Secured to the runner or member 207 is a flexible cable 214 preferably fabricated of steel wire or the like which extends upwardly and overtakes a pulley or sheave wheel 215 which is journaled upon a pin 216 formed on a bracket 217 secured to frame member 24. The cable 214 extends over a second pulley or sheave wheel 218 journaled upon a pin 219 carried by projections formed on a bracket 220, the latter being supported upon a bracket 217. From the wheel 218 the cable 214 extends downwardly into a tube 223 which is mounted in a boss portion 224 formed on the base 10, the upper end of the tube being held to the bracket 217 by means of a clamping member 225, the latter being secured to bracket 217 by means of bolts 226. Slidably disposed within the tube 223 is a cylindrically-shaped weight 227 provided at its upper extremity with an eye 228 to which the cable 214 is attached. As shown in Figure 11 the rollers 203 engaging plates 194 and 195 are connected to the member 207 so that under the influence of gravity the closure engaging means 186 are urged upwardly, exerting upwardly directed force upon the nested closures in two of the magazine tubes 39.

Means are provided for temporarily restraining movement of the runner 207 and associated mechanism. The plate 210 is formed with a pair of spaced projections 230 and disposed between projections 230 in a latching pawl 231 pivotally supported upon a pivot pin 232. A coil spring 233 is shown in Figure 2 and is contained in a socket formed in portion 234 of the pawl 231, urges the latter in a clock-wise direction as shown in said Figure 2. The runner 207 may be moved downwardly until the latch or hook portion 235 engages beneath the laterally extending member 236, thus preventing upward movement of the runner and associated mechanism. A release of the pawl may be effected by slight pivotal movement of the latter in a counter-clockwise direction to disengage the latch 235 from member 236.

Mounted upon the frame member 24 is a pair of cylindrically shaped members or fittings 240 which are secured to the frame 24 by means of screws 241 and form guides for the closures so that the latter may be properly engaged by the closure transferring means. The walls of members 240 are formed with spaced slots 243 and the exterior surfaces of these members are threaded and adapted to receive the ferrules or annulae 244. The members 240 and ferrules 244 function in a manner similar to a collet as the threading of the ferrules on to a member acts to spring the wall portions of a member 240 inwardly. As the closures in the pair of magazine tubes 39, which are in alignment with members 240, are moved upwardly, the ferrules 244 are adjusted until the frusto-conical configuration 245 of each of members 240 is of a dimension to normally prevent the extrusion or escape of caps from the magazine under the influence of the weight 227. The adjustment of the ferrules 244 is such as will permit the release of closures from within the members 240 under the influence of a vacuum created within a zone in the resilient closure engaging cups 69. Due to the fact that the arm or member 58 carrying the closure engaging cups 69 moves in an arc about the axis of the shafts 63 and 64, the upper peripheral edge portions of member 240 are chamfered or angularly disposed as at 247 to facilitate the transfer or removal of closures from the members 240. During the operation of the machine, the arm 58 is moved by the rack and pinion mechanism until the resilient cups 69 contact the upper-most closures disposed within the members 240. A vacuum or sub-atmospheric pressure is impressed in the cups in a manner to be hereinafter explained so that the upper-most closure in each of the two tubes 39 adjacent the members 240 adhere to the cups. The arm 58 is then revolved to a position in which the closures are above the hopper 153, at which time the vacuum in the cups 69 is eliminated and the air pressure returned to normal so that the cups or closures fall by gravity into the chute 154.

Means are provided to limit the number of closures that are delivered into the closure receiving and conveying chute 154. Pivotally supported upon a shaft 250 carried by frame member 24 is an arm or lever 251. The upper end of the lever 251 is provided with a journal pin 252 upon which is revolubly mounted a roller or cam follower 253 which engages the peripheral surface of a cam member 254 mounted upon shaft 63. A coil spring 256 surrounds the journal pin 250 and engages arm or lever 251 to resiliently urge the cam follower 253 into engagement with the cam 254. The lower end of the lever 251 is formed with an elongated boss 258 which is bored to slidably accommodate a cylindrical member 259 which is provided with a head 260. The side wall of the chute 154 is formed with an opening 261 to accommodate the passage of head 260. The member 259 has a hollow interior open to the atmosphere at the rear end thereof, the side wall of the hollow portion being provided with an orifice or opening 262. The boss portion 258 of the lever 251 is provided with an opening in which is disposed a hollow fitting 264 to which is connected a flexible tube 265 communicating with a fitting 266 disposed beneath and connected to the valve chamber or housing 74 which contains mechanism for controlling the existence of vacuum effective through the closure engaging cups 69. The rear portion of the boss 258 is formed with a pair of slots or kerfs 267 to accommodate a stop or abutment pin 268 which extends through diametrically arranged openings in the wall of boss 258. The slots 267 serve as a guiding means to maintain the head 260 in proper relation to enter the opening 261 in the side wall of the closure chute 154. The pin 268 cooperates with the ends of the slots 267 to limit the relative forward motion of member 259 and the head 260, the member being urged in one direction toward the chute under the influence of an expansive coil spring 270. At each cycle of operation of the mechanism, a pair of caps or closures are conveyed from the member 240 into the hopper 153 thence into the chute 154, the cam 254 causing the lever 251 to move the head 260 through the opening 261 in the side wall of the closure chute. If a closure is disposed in the chute so as to be contacted by the head 260, the latter and member 259 are moved relative to the boss portion 258 to "break" the vacuum acting through the closure engaging cups 69 so as to temporarily prevent the further deposition of caps into the chute 154.

In the arrangement of our invention two closures are simultaneously transferred into the hopper 153 at each normal cycle of movement of the arm 58. Means are therefore provided associated with the hopper for preventing the clogging of the chute which might arise by reason of the simultaneous deposition of two caps into the hopper. This means is inclusive of a relatively movable abutment in the form of a pin 273 which is slidably mounted in an opening in a boss 274 formed on a bracket 275 which is secured to the wall of the hopper 153 as shown in Figures 1 and 9. The pin 273 is pivotally connected to its outer end as at 276 to the end of an arm 277, the latter being pivoted intermediate its end upon a shaft 278 carried by projections 279 and formed integrally on bracket 275. The other end portion of arm 277 has an enlarged portion 280 which is bored and threaded to receive the tenon portion 281 of a member 282. The member 282 is provided with a journal portion 283 on which is rotatably mounted a roller or cam follower 285 arranged for engagement with the exterior surface of a cam member 286, the latter being fixedly secured upon the shaft 64 and adapted to rotate therewith. The cam member 286 is of contour to periodically move the pin or abutment 273 into the hopper 153 as shown in Figure 9. The pin 273 is normally urged away from the hopper 153 by means of an expansive coil spring 287 which is disposed between boss 274 and a disc or washer 288 which abuts against a shouldered portion of the pin 273.

In the embodiment illustrated, we have provided the apparatus with eight tubular magazines for retaining a supply of closures, and, as the closures from each set of two magazines are conveyed simultaneously to the hopper 153, means are provided for indexing or positioning the revolving magazine supporting table 32 and the member 48 to which the upper ends of the magazine tubes 39 are secured. To this end, the interior wall 32 of the table is provided with four depressions or indentations 291 which are equally spaced on the interior surface of the table wall. The base 10 is provided upon its upper surface with a raised portion 292 formed with a cylindrical horizontally arranged bore adapted to slidably accommodate a plunger 293. The plunger 293 is bored to accommodate an expansive spring 294 which at all times resiliently urges the plunger 293 radially outwardly. The outer end portion of plunger 293 is formed with a kerf or slot adapted to accommodate a roller 296 which is journaled upon a pin 297 as shown in Figure 7. The roller 296 is adapted for constant engagement with the inner circular wall of the table 32 and with the depressions 291. The registration of roller 296 with one of the depressions indexes or determines the proper position of two of the closure supply magazines 39 to feed closures upwardly through the fittings 240. Relative rotation of the plunger 293 is prevented by means of a member or key 299 projecting into a longitudinally extending kerf or groove 300 formed in the plunger 293. While the cooperation of key 299 with slot 300 prevents relative rotary movement of plunger 293, this arrangement does not interfere with the longitudinal slidable movement of the plunger.

The operation of the apparatus of our invention is as follows: The operator first fills the magazine tubes 39 with groups of nested closures C in inverted position. This is accomplished in a most facile manner, as the operator grasps a nest of closures and inserts them into the uppermost open ends of the magazine tubes while the cap engaging means 186 are at their lower-most positions in the tubes 39. The runner or member 207 mounted on the rod 208 is retained at its lower-most position by the latch 235 being hooked beneath member 236 so as to permit the closure engaging means in the two magazines in alignment with fittings 240 to rest in their lower-most positions. The movement of member 207 to its lowest position elevates the weight 227 to its upper-most position in the guide tubes 223.

After the operator fills the magazine tubes 39 with closures, the table 32 is maintained in a predetermined position with the roller 296 engaged in one of the depressions 291 in which position two of the magazine tubes 39 are in alignment with the fittings 240 and in position to feed the closures upwardly. The operator then releases the pawl member 231 so as to disengage the hook 235 from member 236, and member 207 is permitted to move upwardly under the influence of the weight 227 until the rollers 203 carried by the yoke 200 engage the plates 194 and 195 forming elements of the closure engaging means 186 and thus provide an upward force acting against the closures. The switch 101 is manipulated to energize the electric motor 96 mounted within the base 10, and initiate the operation of the vacuum pump 106 through the medium of the belt 116, the motor simultaneously rotating the crank 129 through suitable reduction gearing to vertically reciprocate the rod 132, turn-buckle 136, plunger 139 and rack 149. The rack 149, being enmeshed with the pinion 150, causes partial rotation of the shafts 63 and 64. This rotation of shafts 63 and 64 moves the arm 58 and resilient closure engaging cups 69 in a counterclockwise direction, as viewed in Figure 1, to bring the cups into engagement with the uppermost closures in the two magazines 39 that are in alignment with the members 240. The vacuum pump 106 being constantly operated by the motor 96 sets up vacuum or sub-atmospheric pressure in the tube 77 which leads to the valve chamber or housing 74, the latter being in communication with the cups 69 through the manifold or duct 70 formed in the arm 58. A vacuum is not effectively set up in the manifold formed in the arm 58 until the resilient cups 69 engage the closures. The closures per se act as valves closing the entrance to the cups 69 whereupon the action of the vacuum pump 106 sets up sub-atmospheric pressure in the duct 70 and cups 69. The turn-buckle 136 is adjusted so that when the crank 129 is in its upper-most vertical position the cups 69 contact the two uppermost closures. Further rotation of the crank 129 moves the rack 149 downwardly and oscillates arm 58 in a clock-wise direction as viewed in Figure 1 carrying with it two closures, one upon each of the cups 69. The closures are held to the caps by atmospheric pressure effective by reason of the subatmospheric pressure existing within the cups and the manifold 70 formed in the closure transferring means 58. When the arm 58 reaches a position in which the cups 69 and closures carried thereby are above the mouth portion of the hopper 153, the raised or lobe portion 89 of cam 86 moves the valve stem 80 and valve 81 longitudinally to admit air under atmospheric pressure into the valve housing or chamber 78 and ducts 72 and 70 through vent 85 to equalize pressure within the resilient cups 69. As the closure engaging surface portions of the cups 69 are in substantialy vertical position when the pressure has been equalized, the closures carried thereby will fall into the hopper 153. At the time the closures are discharged from the cap 69, the cam member 285 oscillates the arm 277 to a position wherein pin 273 projects into the hopper 153. As the closures fall into the hopper, the closure in line with the pin 273 is restrained by the pin 273 from further downward movement thus permitting the other closure to pass into the delivery chute 154. Further movement of the cam 286 permits the pin 273 to be withdrawn from hopper 153 under the influence of the spring 287 so that the second closure may move into the chute 154. By this means the closures are permitted to enter the chute 154 consecutively thus avoiding any possible clogging of closures at the throat of the hopper. Before the completion of the next cycle of closure transference, the cam 286 moves the pin 273 into the hopper to temporarily obstruct one of the next succeeding closures deposited in the hopper.

During each closure transferring cycle, the cam 254 in engagement with the roller 253 carried by arm 251 oscillates the arm about its pivotal support 250 to move the head 260 through the opening 261 in the side wall of chute 154. The purpose of this mechanism is to render effective or ineffective the closure transferring means dependent upon the number of closures in the chute 154. If there are a sufficient number of closures in the chute 154 so that a closure obstructs the opening 261 and is engaged by the head 260 of the plunger 259, further movement of the arm 251 under the influence of cam 254 causes relative sliding movement of the plunger 259 in the boss portion 258 so that the vent opening 262 in the side wall of the plunger is in registration with the entrance to the duct 265, to establish communication between the duct 265 and the atmosphere. This condition "breaks" the vacuum in chamber 78, manifold 70 in the arm 58 and cups 69 rendering the latter ineffective to remove closures from the closure supply through fittings 240. Thus the arm 58 and associated mechanisms continue to move through their usual mechanical cycles, but there will be no transfer of closures effected until closures in the chute 154 have been discharged therefrom. As discharge of closures from chute 154 onto containers progresses, the closures will not obstruct movement of the head 260 as it moves through the opening 261 in the side wall of the chute and transfer of closures from the supply to the hopper 153 and chute 154 will be resumed.

The closures pass downwardly through the chutes 154, 158 and 169 to the discharge station where the resiliently mounted wings 171 temporarily retain the lower-most closure until a receptacle or bottle moving past the station effects a removal of the closure held by the wings 171. As the closures are successfully discharged from the station the remaining closures in the chute move downwardly and successive caps will be transferred by the arm 58 into the hopper as long as the movement of the head 260 into the opening in the side wall of tube 154 is unimpeded by its engagement with a closure.

The chute section 169 may be adjusted laterally by manipulation of the knurled wheel 166 which moves the sections 158 and 169 about the pivot pin 159 to shift the discharge station at the extremity of the section 169 in a lateral direction for the purpose of accommodating milk bottles of different sizes. This is necessitated by reason of the fact that milk bottles of different sizes occupy different relative positions on the conveyor mechanism (not shown) which is used to convey and transfer filled milk bottles past the closure discharge station. The closures in the two magazine tubes 39 in alignment with the fittings 240 are continuously urged upwardly under the influence of the weight 227 contained within the tube 223 as the weight is joined to the runner 207 by means of cable 214. The annulae 244 are threadedly adjusted upon the fittings 240 so as to adjust or distort the portions 245 of fittings 240 to engage the upwardly projecting skirt portions of the closures C with sufficient friction to retain the closures in the tubes until the closure transferring cups 69 engage the closures to selectively remove them from the fittings 240.

When all of the closures have been extruded and transferred from the tubes 39 that are temporarily in alignment with fittings 240, the operator grasps the runner 207 and moves the same downwardly until the ledge 235 on the latch member 231 engages the member 236 to temporarily hold the runner 207 in an out-of-use position. The operator then rotates the table 33 through 90 degrees until the roller 296 engages in the next succeeding depression or recess 291 in the annular portion 32 of the table. This movement of table 33 brings the next succeeding set or pair of tubes filled with closures into alignment with the fittings 240. The operator then releases the latch pawl 231 to permit the runner 207 under the influence of the weight 227 to engage the plates 194 and 195 of the closure engaging and elevating means contained within said tubes. With this arrangement the operator may replenish the supply of closures in the empty tubes without interrupting the operation of the closure feeding and transferring machine.

It is apparent that within the scope of the invention modification and different arrangements may be made other than is herein described, and the present disclosure is illustrative merely, the invention comprehending all variations thereof.

What we claim is:

1. In combination a frame, a base, a container closure delivery chute associated with said frame; a rotatable turret type magazine mounted upon said base and adapted to contain a plurality of preformed container closures; means for withdrawing said preformed closures from the upper end of said rotatable magazine; said closure withdrawing means being arranged to transfer said withdrawn closures; means for moving the supply of closures upwardly in said magazine; said closure withdrawing and transferring means being arranged for coaction with differential air pressure for causing said closures to adhere to said closure withdrawing means, and means for normalizing said differential pressure whereby the closure adhering to the closure withdrawing means is deposited into the delivery chute.

2. In combination, a frame, a base, a container closure delivery chute associated with said frame; a turret type magazine mounted on said base and adapted to be rotated thereon, said magazine adapted to contain a plurality of preformed container closures; means for withdrawing closures from the upper end of said magazine; said closure withdrawing means being arranged to transfer said withdrawn closures to said delivery chute; means for upwardly biasing the supply of closures in said magazine; said closure withdrawing and transferring means being formed with a zone in which is impressed sub-atmospheric pressure for causing said closures to adhere to said closure withdrawing means, and means for normalizing said sub-atmospheric pressure whereby the closure adhering to the closure withdrawing means is deposited into the delivery chute.

3. In combination, a base, a frame, a container closure delivery chute associated with said frame; a vertical, rotatable turret type magazine mounted upon said base and adapted to contain a plurality of preformed container closures; means for withdrawing closures from the upper end of said magazine; said closure withdrawing means being arranged to transfer said withdrawn closures to said delivery chute, and means for elevating the supply of closures in said magazine.

4. In combination, a base, a frame; a vertical, rotatable type magazine mounted upon said base and adapted to contain a plurality of preformed container closures; means for withdrawing closures from the upper end of said magazine; said closure withdrawing means being arranged to convey said withdrawn closures to a discharge point away from said magazine, and means for urging said supply of closures upwardly in said magazine.

5. In combination, a base, a frame; a vertical magazine rotatably mounted upon said base and adapted to contain a plurality of preformed container closures; means for withdrawing closures from the upper end of said magazine and conveying the closures to a discharge point away from said magazine; said closure withdrawing means being associated with a zone of differential air pressure for causing said closure to cooperate with the withdrawing means during closure withdrawing operations, and means for normalizing the pressure whereby said closures are discharged from said withdrawing means.

6. In combination, a frame; a base, a hopper mounted upon said frame, an angularly arranged container closure delivery chute associated with said hopper; a vertical, rotatable magazine containing a plurality of tubes and adapted to contain a plurality of groups of preformed closures supported upon said base and arranged for movement relative to said frame; a closure transferring means disposed above said magazine and adapted to selectively remove closures from two of said magazine tubes; said transferring means being provided with a zone in which sub-atmospheric pressure may be set up whereby said closures are caused to adhere to the transferring means for normalizing the pressure in said zone to deposit said transferred closures into the delivery chute.

7. In combination, a base, a frame, a vertical, rotatable turret type magazine, said magazine comprising a plurality of tubes containing supplies of preformed container closures for immediate use, and a plurality of tubes containing a reserve supply of preformed closures; said magazine being supported upon said base and relatively movable with respect to said frame; means for withdrawing said preformed container closures from the upper ends of a plurality of said tubes and transpositioning them away from said tubes;

said magazine being arranged for movement to selective positions whereby said tubes may be moved into operative association with said closure engaging and transferring means.

8. In combination, a base, a frame, a hopper, a rotatable magazine comprising a plurality of tubes containing supplies of preformed container closures; said magazine being supported upon said base and relatively movable with respect to said frame; means for withdrawing container closures from the upper ends of said tubes; a hopper associated with said frame, a closure delivery chute associated with said hopper; said closure withdrawing means adapted to transfer said withdrawn closures to said hopper and said delivery chute; said magazine being arranged for movement to selective positions whereby said tubes may be moved into operative association with said closure engaging and transferring means.

9. In combination, a base, a frame, a hopper, a vertical rotatable magazine, said magazine adapted to contain a plurality of tubes with groups of preformed container closures; said magazine being supported upon said base and relatively movable with respect to said frame; means for withdrawing container closures from the upper portion of two of said magazine tubes; a closure delivery chute associated with said hopper; said closure withdrawing means adapted to transfer withdrawn closures to said delivery hopper and said chute; said magazine tubes being arranged for movement to positions whereby said groups of closures may be selectively moved into operative association with said closure engaging and transferring means.

10. In combination, a base, a frame, a hopper; a container closure delivery chute associated with said hopper; a rotatable closure supply magazine including a plurality of vertically disposed tubes supported upon said base and relatively movable with respect to said frame; each of said tubes adapted to contain a group of closures; a closure transferring means disposed above two of the closure supply magazine tubes; means associated with said magazine for guiding said closures in position to be engaged by said closure transferring means and for normally restraining upward movement of the closures; means for upwardly biasing the closures in said tubes into the closure guiding and restraining means, said transferring means adapted to selectively transfer closures from the closure guiding means to the closure hopper and said delivery chute.

11. In combination, a base, a frame; an angularly disposed container closure delivery chute associated with said frame; a rotatable closure supply magazine including a plurality of vertically disposed tubes supported upon said base and relatively movable with respect thereto; each of said tubes adapted to contain a group of closures; a plurality of said tubes to contain closures for current use, a plurality of said tubes to contain closures in reserve, a closure transferring means disposed above the closure supply magazine; means associated with said magazine for positioning said closures for current use to be engaged by said closure transferring means; weight actuated means for upwardly biasing the closures in said tubes for current use to move same into the closure positioning means; said closure positioning means being arranged to normally retain the supply of closures in the tubes, said transferring means adapted to selectively transfer closures through the closure positioning and retaining means to the closure delivery chute.

12. In combination, a frame; an angularly disposed closure delivery chute associated with the frame and having an enlarged mouth; a closure transferring means mounted upon said frame and arranged for movement relative thereto; a vertical closure supply magazine containing a plurality of tubes disposed beneath the closure transferring means; a plurality of said tubes to hold closures for present use and a plurality of said tubes to hold closures in reserve, means for upwardly biasing the closures in said tubes holding closures for current use whereby the closure transferring means may successively engage the upper-most closure for transferring the same to a position above the mouth of the delivery chute; said closure transferring means being formed with a zone which is impressed sub-atmospheric pressure for causing said closures to adhere to the closure transferring means; and means operable upon the closure transferring means reaching a predetermined position for normalizing the pressure to deposit the transferred closure into the mouth of the delivery chute.

13. In combination, a base, a frame; an angularly disposed container closure delivery chute associated with the frame; a rotatable closure supply retaining means including a plurality of closure retaining tubes disposed in substantially vertical relationship and supported upon said base, a plurality of said tubes containing closures for current use, and a plurality of said tubes containing closures for reserve use; a closure transferring means including a relatively movable member supported upon said frame; a closure engaging means carried by said arm; means for actuating said member and closure engaging means for withdrawing closures from said magazine tubes containing closures for current use and conveying them to said delivery chute; said closure engaging means being provided with a zone of sub-atmospheric pressure whereby said closures are engaged and transferred by said closure engaging means; means for increasing the pressure in said zone to release said closures whereby the same are deposited in the closure delivery chute; and weight actuated means engageable with the closure engaging means in said tubes for moving said closures upwardly in said tubes.

14. In combination, a base, a frame; a container closure transferring means supported upon said frame; a vertically disposed closure supply magazine including a plurality of container retaining tubes mounted upon said base, said tubes containing closures for current use and closures for reserve, and said magazine rotatable with respect to said base; said closure transferring means being disposed above said magazine; said closure transferring means having a pair of elements adapted for engagement with closures in two of said tubes for simultaneously transferring two closures from said two tubes to a point remote therefrom; means for exerting an upward force upon the closures in the two tubes that are in cooperative relation with said closure transferring means; said magazine being rotatable with respect to said frame for selectively moving pairs of closure containing tubes into position whereby the closure transferring means may withdraw reserve closures therefrom; and resilient means for indexing said magazine to its selective positions.

15. In combination, a base, a frame; an angularly disposed container closure delivery chute associated with the frame; a closure supply retaining means including a plurality of closure retaining tubes disposed in substantially vertical relationship and revolubly supported upon said base; two of said tubes containing closures for current use, a plurality of said tubes containing reserve closures; a closure transferring means including a relatively movable arm supported upon said frame; a pair of closure engaging means carried by said arm; means for actuating said arm and pair of closure engaging means for withdrawing two closures from said magazine tubes containing closures for current use and conveying them to said delivery chute; said closure engaging means being provided with a zone of sub-atmospheric pressure whereby said closures are engaged and transferred by said closure engaging means; means for periodically increasing the pressure in said zone to release said closures whereby the same are disposed into the closure delivery chute; means in said magazine tubes for elevating the closures therein, and means for indexing said revolubly supported closure supply retaining means to selectively move the tubes into operative association with the closure transferring means whereby closures may be withdrawn from said tubes.

16. In combination, a base, a frame; a hopper supported by said frame; a container closure delivery chute associated with said hopper; a closure supply retaining means including a plurality of closure container tubes supported for relative rotatable movement upon said base; a closure transferring means having a pair of elements engageable with closures in two of said tubes for simultaneously withdrawing a closure from each of said two tubes; means for simultaneously releasing both closures from the closure transferring means whereby the closures are deposited in the mouth of the hopper; means in the mouth portion of said hopper including a movable abutment adapted to temporarily obstruct downward movement of one of the two closures deposited into the hopper until the other of said two closures has left the hopper and entered the delivery chute, and means for withdrawing said abutment to permit the closure held in the hopper to be subsequently discharged into the delivery chute.

17. In combination, a base, a frame; a container closure delivery chute associated with the frame; a closure supply retaining means including a plurality of rotatable closure magazines disposed in substantially vertically relationship and supported upon said base; a closure transferring means including a relatively movable arm supported upon said frame; a pair of closure engaging means carried by said arm; means for actuating said arm and said pair of closure engaging means for withdrawing two closures from two of said magazine tubes and conveying them to said delivery chute; said pair of closure engaging means being provided with a zone of sub-atmospheric pressure whereby said two closures are engaged and transferred by said pair of closure engaging means; means for periodically increasing the pressure in said zone to release said closures whereby the same are disposed into the closure delivery chute; means in said magazine tubes for engaging and elevating the closures therein; actuating means engageable with the closure engaging means in said tubes for biasing said closure in an upward direction; means for positioning two of said tubes whereby closures may be simultaneously withdrawn from two of said tubes; and means for moving said tubes relative to said base to bring successive pairs of tubes into operative association with said closure withdrawing and transferring means.

18. In combination, a base, a frame; a closure delivery chute associated with the frame; a pair of relatively movable closure transferring means supported upon said frame; a rotatable closure supply magazine including a plurality of closure retaining tubes disposed vertically beneath said closure transferring means; means for upwardly biasing said closures within two of said tubes whereby the closures in said two tubes are moved to a position to be engaged and withdrawn by said pair of closure transferring means; said closure transferring means including a zone arranged to be impressed with sub-atmospheric pressure for causing said closures to adhere to the closure transferring means; means set into operation upon pre-determined movement of said closure transferring means for normalizing the pressure in said zone to discharge the closures from the closure transferring means into the delivery chute; and supplemental means rendered active upon the accumulation of a pre-determined number of closures in said closure delivery chute for normalizing the pressure in said zone to render said closure transferring means inactive to withdraw additional closures from the closure supply; said supplemental means being rendered inactive upon the discharge of closures from the closure delivery chute to restore normal operation of said closure withdrawing means.

WILLY E. ZIMMERMANN.
HERMAN E. WEIDANZ.

REFERENCES CITED

The following references are of record in the file of this patent:

UNITED STATES PATENTS

| Number | Name | Date |
|---|---|---|
| 2,074,815 | Tevander et al. | Mar. 23, 1937 |
| 2,325,165 | Goodwin | July 27, 1943 |
| 2,359,367 | Kerr-Lawson | Oct. 3, 1944 |
| 2,361,176 | Carvey | Oct. 24, 1944 |
| 2,403,862 | Lakso | July 9, 1946 |